Patented Dec. 4, 1951

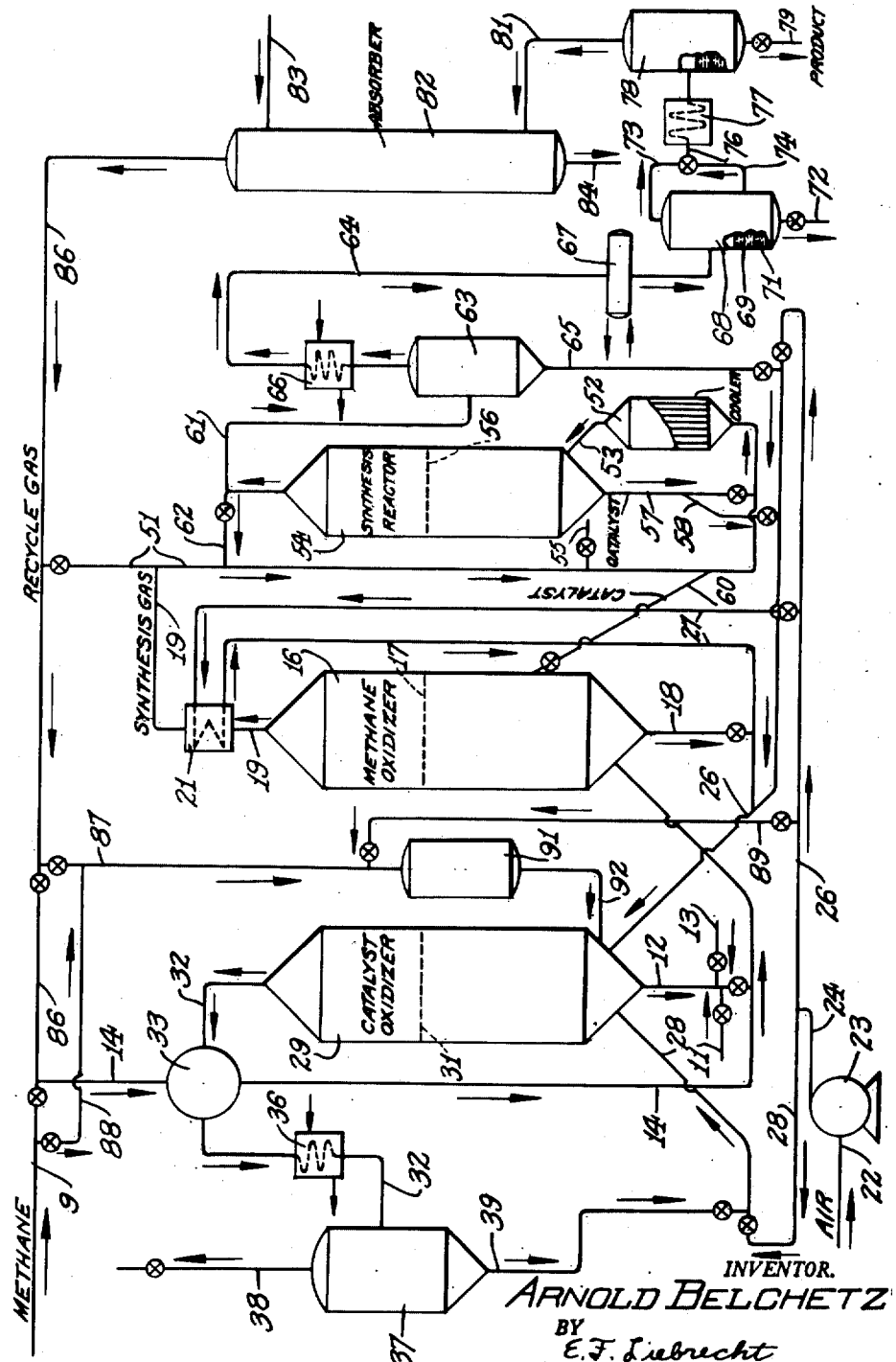

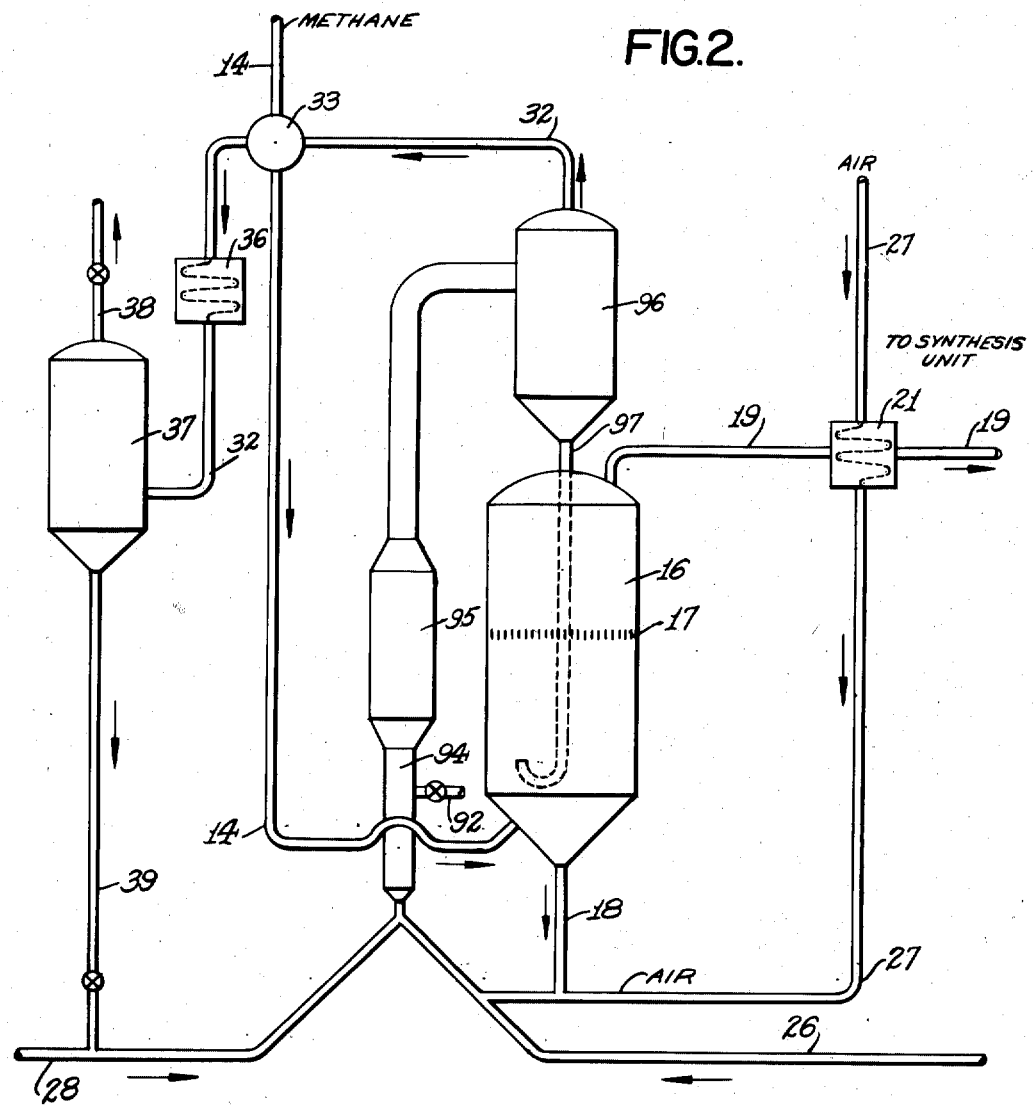

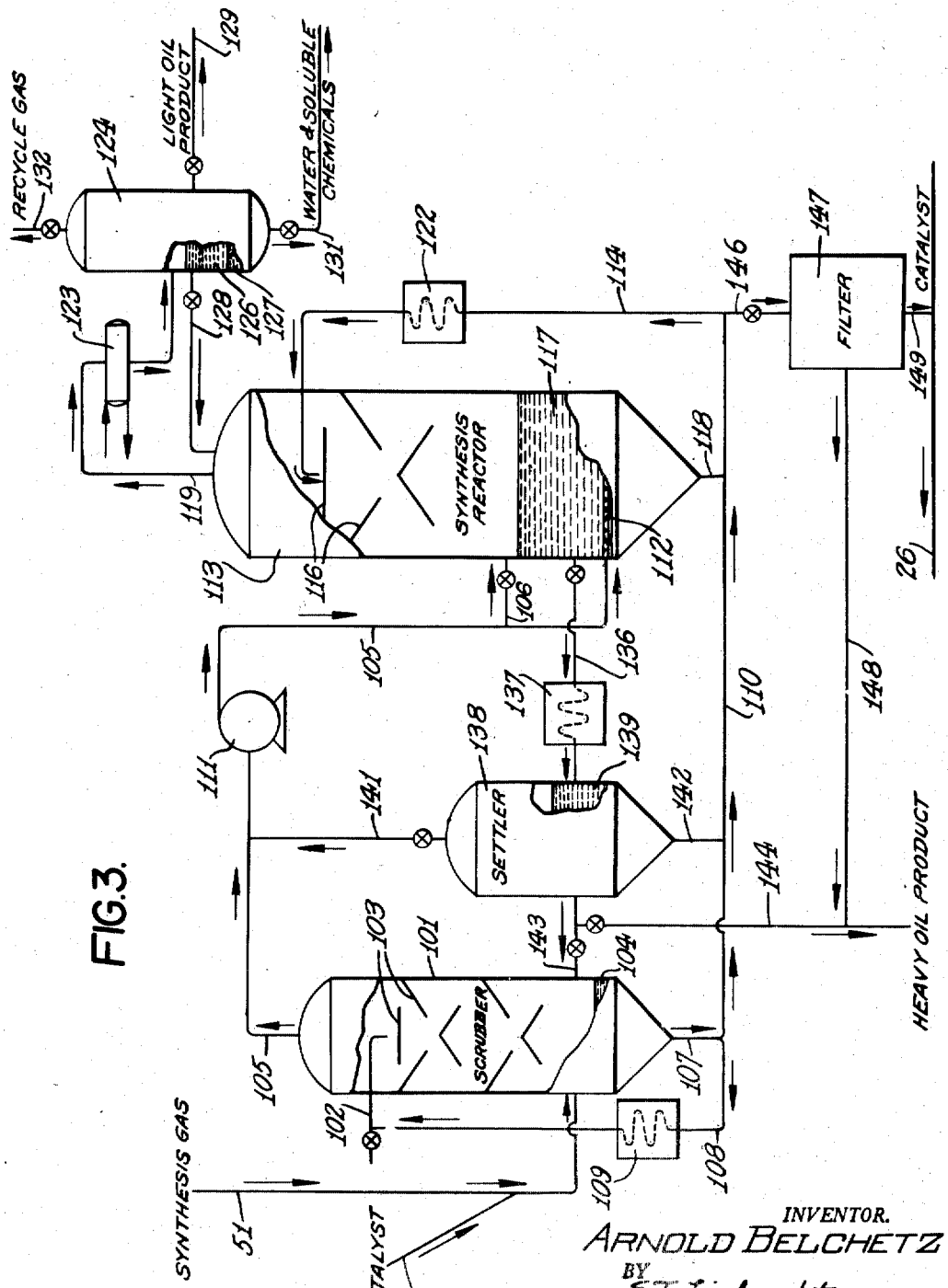

2,577,563

UNITED STATES PATENT OFFICE 2,577,563

PREPARATION OF HYDROGEN-CARBON OXIDE MIXTURES AND CATALYTIC REACTION THEREOF

Arnold Belchetz, Larchmont, N. Y., assignor to The M. W. Kellogg Company, Jersey City, N. J., a corporation of Delaware Application May 20, 1947, Serial No. 749,282

21 Claims. (Cl. 260—449)

1

This invention relates to the hydrogenation of carbon oxides to produce hydrocarbons having more than one carbon atom per molecule and oxygenated organic compounds. In one aspect this invention relates to the hydrogenation of carbon monoxide in the presence of a finely divided hydrogenation catalyst under conditions such that organic compounds are produced. The process of this invention is applicable also in reacting hydrogen with carbon dioxide. In the following description of the invention the hydrogenation of carbon monoxide will be referred to specifically. It will be understood, however, that the invention is of wider application including within its scope the hydrogenation of any oxide of carbon.

It has been known for some time that hydrogen and carbon monoxide may be made to react exothermically in the presence of a catalyst under specific reaction conditions to form hydrocarbons and oxygenated compounds. In general, the synthesis of these organic compounds by the hydrogenation of carbon monoxide is accomplished in the presence of a metal or an oxide of a metal chosen from group VIII of the periodic table as a catalyst at pressures below about 500 pounds per square inch gage and at temperatures below about 750° F.

The synthesis feed gas or reaction mixture comprises a mixture of about 1 to 2 mols of hydrogen per mol of carbon monoxide.

An object of this invention is to provide an improved process for the synthesis of organic compounds.

It is also an object of this invention to produce a gas rich in hydrogen and an oxide of carbon, such as carbon monoxide.

Another object of this invention is to provide an integrated process for the preparation of the feed gas and the synthesis of organic compounds therefrom.

Still another object of this invention is to provide a method for hydrogenating carbon monoxide in the presence of a finely divided hydrogenation catalyst.

Still another object of this invention is to provide a method for manufacturing a hydrogenation catalyst useful in the hydrogenation of carbon monoxide to produce organic compounds therefrom.

It is still another object of this invention to provide a method for controlling the temperature of reaction in the synthesis of organic compounds by the hydrogenation of carbon monoxide.

Yet a further object of this invention is to

2 provide a method for the regeneration of a partially deactivated catalyst for use in the hydrogenation of carbon monoxide.

Another object of this invention is to provide a process for the hydrogenation of carbon monoxide by the use of a relatively cheap and inexpensive hydrogenation catalyst.

Various other objects and advantages will become apparent to those skilled in the art from the accompanying description and disclosure.

It is believed that the invention may be best described by reference to the accompanying drawings which show a process for the hydrogenation of an oxide of carbon to produce organic compounds. Figure 1 of the drawings is a diagrammatic illustration in elevation, partly in cross section, of an arrangement of apparatus for the synthesis of hydrocarbons with a finely divided hydrogenation catalyst suspended in a gaseous reaction mixture. Element 29 is a catalyst oxidizer in which the hydrogenation catalyst is oxidized. Element 16 is a methane oxidizer in which methane is oxidized by means of the oxidized catalyst from element 29 to produce hydrogen and an oxide of carbon. Element 54 is a synthesis reactor for the conversion of the hydrogen and the oxide of carbon from methane oxidizer 16 to organic compounds. Figure 2 of the drawings is a diagrammatic illustration in elevation of a modification of element 29 of Figure 1. Figure 3 of the drawing is a modification of the process and arrangement of apparatus shown in Figure 1 and diagrammatically illustrates in elevation an arrangement of apparatus, partly in cross section, for the reaction between an oxide of carbon and hydrogen to produce organic compounds in the presence of a finely divided hydrogenation catalyst suspended in a liquid. Element 113 of Figure 3 represents a synthesis reactor corresponding to element 54 of Figure 1 but in which the finely divided hydrogenation catalyst is suspended in a liquid rather than a gas. The use of catalyst oxidizer 29 and methane oxidizer 16 is contemplated for the preparation of the catalyst and the gaseous feed stream to synthesis reactor 113 of Figure 3.

In Figure 1 of the drawings, pure methane or a methane-containing gas from any suitable source, such as natural gas or petroleum refinery waste gases, passes continuously through conduits 9 and 14 to a preheater 33, which comprises a single or series of conventional heat exchangers and/or gas fired furnaces for preheating the methane-containing stream to a temperature of about 800° F. to about 1700° F., and thence to methane oxidizer 16 comprising an elongated cylindrical chamber internally insulated with refractory material. A finely divided solid catalyst comprising an oxide, such as an oxide of iron or other metal oxide, at a temperature of about 1850° F. is introduced from conduit 12 into the gaseous stream in conduit 14 and is carried thereby to methane oxidizer 16. Fresh metal oxide may be introduced into the system through conduit 11 when and if necessary. A gaseous mixture comprising methane passes upwardly and continuously through reactor 16 at a velocity sufficient to suspend, in the preferred embodiment, the metal oxide in a pseudo-liquid fluidized condition in methane oxidizer 16 whereby the metal oxide particles attain a high degree of turbulence in a pseudo-liquid dense phase of finely divided solids. In the formation of the pseudo-liquid dense phase of metal oxide in reactor 16, an interface designated as 17 exists between the pseudo-liquid dense phase and a so-called upper dilute phase. A very small amount of entrained catalyst is present in the dilute phase, usually less than about 0.01 pound of solid per cubic foot of gas. In methane oxidizer 16 methane is converted to an oxide of carbon and hydrogen as exemplified by the following typical reaction equations for iron oxides:

$$Fe_3O_4 + CH_4 = CO + 2H_2 + 3FeO$$
$$3FeO + 3CH_4 = 3CO + 6H_2 + 3Fe$$
$$Fe_3O_4 + 4CH_4 = 4CO + 8H_2 + 3Fe$$

Generally, the temperature of methane oxidation zone 16 will be between about 500° F. and about 1700° F. and the actual operating temperature will depend upon such factors as the composition of the effluent desired and the particular metal catalyst used.

The reactions of the metal oxides with methane to produce hydrogen and carbon monoxide or carbon dioxide are equilibrium reactions each of which reactions are favored by certain conditions of temperature. At relatively high temperatures within the ranges disclosed, the production of carbon monoxide and hydrogen is favored. At relatively low temperatures within the ranges disclosed, the production of carbon dioxide and water is favored. At substantially all temperatures both carbon dioxide and carbon monoxide as well as water will be present to some extent in the effluent from the methane oxidation zone. Therefore, the temperature employed in the methane oxidation zone will often be determined by the amount of carbon dioxide permissible in the synthesis feed gas.

The metal oxide catalyst may be present in any one of several forms, such as FeO, $Fe_2O_3$, and $Fe_3O_4$, and the reaction of the metal oxide with methane reduces the catalyst to a lower oxide or to the elementary metal; under the preferred operating conditions and when using an iron-containing catalyst the iron oxide is reduced to the elementary iron. When using an iron oxide as the source of oxygen, the temperature of reaction in methane oxidizer 16 is between about 1100° F. and about 1700° F., for example about 1650° F. when it is desired to produce carbon monoxide and hydrogen as the main products of the effluent. Temperatures of reaction in methane oxidizer 16 above about 1700° F. (and in catalyst oxidizer 29 above about 2000° F.) are undesirable in most instances because of the proximity to the welding temperature of the metal of the catalyst, such as iron, and the weakening of the ferruginous structural material because of grain growth at high temperatures. Another factor in limiting the temperature is the difficulty of fluidization of the catalytic material at high temperatures.

Sufficient contact time should be allowed between methane and the metal oxide for substantially equilibrium conditions to be achieved. An average contact time of methane and the products of reaction of the methane with the finely divided oxide in oxidizer 16 of between about 10 and about 60 seconds is sufficient, preferably between about 15 and about 30 seconds, when employing a ferruginous catalytic material. The velocity of the upwardly flowing methane containing stream is between about 0.5 and about 6 feet per second, preferably about 1.5 feet per second, when the metal oxide or metal is maintained in the pseudo-liquid fluidized condition. A pressure from about atmospheric to about 500 pounds per square inch gage is appropriate, preferably the pressure is between about 50 and about 300 pounds per square inch gage and will correspond substantially to the pressure maintained in synthesis reactor 54 and catalyst oxidizer 29. When converting methane with an iron oxide catalyst, a pressure of about 80 pounds per square inch gage is generally employed.

The presence in the catalytic material of minor proportions, usually between about 0.1 and about 5.0 weight per cent, of promoters, such as copper, manganese, or an alkali metal or alkaline earth compound is recommended in order to promote the oxidation of methane and also because of their beneficial effect in the subsequent hydrogenation of carbon monoxide in reactor 54.

Since the oxidation of methane is endothermic, heat must be supplied to the methane oxidation reaction in oxidizer 16. Necessary heat is supplied to the methane oxidation reaction according to this invention from the sensible heat of the solid material from catalyst oxidizer 29 and by preheating the methane feed stream. The application of the source of heat supply to oxidizer 16 will be more fully discussed hereinafter.

When the methane-containing stream in conduit 14 contains carbon dioxide, which may accompany the methane in conduit 9 or may be introduced into conduit 4 as a component of the recycle gas from conduit 86, the carbon dioxide may react with methane in the presence of the metal oxide to produce carbon monoxide and hydrogen in accordance with the following typical equation:

$$CH_4 + CO_2 = 2CO + 2H_2$$

The reaction effluent from methane oxidizer 16 passes therefrom through conduit 19, a conventional heat exchanger 21, and finally to an upflow fluid bed synthesis reactor 54. The reaction effluent contains carbon monoxide, carbon dioxide, hydrogen, water, and small amounts of unconverted gases, such as methane, as well as a small amount of entrained metallic material. This entrained metallic material comprises reduced catalyst resulting from the reduction of the metal oxide to a lower oxide or the elementary metal. By heat exchange with air in heat exchanger 21, the effluent from methane oxidizer 16 is rapidly cooled to a temperature of about 1000° F. or lower, preferably to about 600° F. Cooling or quenching of the effluent as rapidly as possible is highly desirable when operating at relatively high temperatures in methane oxidizer 16, such as when employing an oxide of iron to produce carbon monoxide, in order to prevent or minimize the formation of methane and carbon dioxide during the cooling process. At a linear velocity of about 1.5 feet per second in oxidizer 16, the carry over of solid material of finely divided form is about 0.002 to about 0.01 pound per cubic foot of flowing gas. The actual carry over of solids will depend ultimately on the physical characteristics of the solid material, such as density and size, and upon the gas velocity.

As a result of the conversion of methane to carbon monoxide and hydrogen, iron oxides, for example, are reduced and the reduced iron oxides in the form of a lower oxide or elementary iron is removed from the dense phase of methane oxidizer 16 through conduit 18 and introduced into conduit 27. Air is continuously introduced into the system through conduit 22 and compressed by means of a conventional compressor or blower 23 and passed through conduits 24 and 26 to catalyst oxidizer 29 which also comprises an elongated cylindrical chamber of steel. Catalyst oxidation chamber 29 is internally insulated with a suitable refractory material, such as fire clay or alumina, which refractory material may be internally lined with a relatively thin sheet of heat and corrosion resistant alloy, such as Inconel which contains about 80% nickel with 15% chromium and 5% iron in solid solution. At least a portion of the air in conduit 26, according to the preferred operating technique, is by-passed through conduit 27 to heat exchanger 21 to remove a portion of the heat from the effluent from methane oxidizer 16 and thereby also preheating the air to a temperature as high as about 600° F. or 700° F. Air from preheater 21 is passed through conduit 27 to conduit 26. From conduit 18, finely divided solid material containing catalyst and at a temperature corresponding approximately to the temperature prevailing in reactor 16 is picked up by the air passing through conduit 27 and is carried to conduit 26 and thence to catalyst oxidizer 29. In catalyst oxidizer 29 the reduced oxide of a metal or an elementary metal, such as iron, is oxidized to a higher oxide or to an oxide therein, as the case may be. Preferably, when the metal is iron, a temperature between about 1200° F. and about 2000° F. is maintained in catalyst oxidizer 29. As in methane oxidizer 16, the solid material containing catalyst is suspended in an upward flowing stream of air such that a pseudo-liquid dense phase of finely divided solid material is formed therein having an interface 31 between the pseudo-liquid dense phase in the lower portion and a dilute phase in the upper portion of reactor 29. The pressure in catalyst oxidizer 29 is between about atmospheric and 500 pounds per square inch gage and will generally correspond to the pressure in methane oxidizer 16 and synthesis reactor 54.

As previously discussed, the finely divided solids comprising a metallic oxide is withdrawn from catalyst oxidizer 29 through standpipe 12 and introduced into conduit 14 through which the methane screen is passing. The solids are maintained in a fluidized condition and stripped of nitrogen in standpipe 12 by introducing steam, or recycle gas, or other gas, through conduit 13. Fresh metallic oxide or catalytic material may be introduced into conduit 12 through conduit 11.

Instead of air substantially pure oxygen or other oxidizing gas may be used for oxidizing the catalytic material in catalyst oxidizer 29 without departing from the scope of this invention. Air, however, is the preferred oxidizing gas both because it is the most inexpensive source of oxygen and because the nitrogen present serves as a diluent which fact results in better control of the oxidation reaction.

A gaseous effluent is continuously withdrawn from catalyst oxidizer 29 through conduit 32. This gaseous effluent contains nitrogen, oxygen, and finely divided entrained metal oxides or other solids. The effluent is passed through methane preheater 33, as previously described, which results in cooling the effluent to a temperature as low as about 400° F. or lower, and thence through conduit 32 to steam generator or waste heat boiler 36 and to catalyst separator 37. Separator 37 may comprise a cyclone separator, a Cottrell precipitator, or other conventional means known to those skilled in the art for separating the metal oxides from the gaseous effluent. Gases comprising nitrogen and substantially free from entrained finely divided solids are removed from separator 37 through conduit 38 and may be vented to the atmosphere. Separated solids or metal oxides are collected in standpipe 39 and introduced by gravity into a stream of air flowing through conduit 28 for transfer back to catalyst oxidizer 29, as shown.

The operation of catalyst oxidizer 29 is similar in many respects to the operation of methane oxidizer 16. From the standpoint of heat transfer, catalyst oxidizer 29 must be operated at a temperature above that which is maintained in the methane oxidizer 16. When iron, for example, is oxidized, heat is liberated and it is desirable that sufficient catalyst be circulated to absorb this heat within the temperature limits set for methane oxidizer 16 and catalyst oxidizer 29. Since, for reasons given previously, a temperature of about 1650° F. would be as high as necessary or desirable in the methane oxidizer, it is unlikely that it would be necessary to maintain a temperature of much above 1850° F. in the catalyst oxidizer 29. These temperatures would give a spread of 200° F. which is usually ample for heat absorption and transfer purposes. It is desirable to maintain the temperature in the catalyst oxidizer as low as possible, as mechanical difficulties decrease the lower the temperature in the system. Sufficient solid material should be circulated to absorb the heat evolved in the catalyst oxidation between the desired temperature levels and sufficient metal should be present in the catalyst or solid material to absorb the oxygen which is required later in the methane oxidation step.

For example, the heat liberated in the oxidation of the iron will depend upon the condition in which the iron enters the oxidizer and on the particular oxide which is formed in the oxidation; thus, if the iron is oxidized from metallic iron to FeO, less heat would be evolved than if it were oxidized to $Fe_3O_4$, or $Fe_2O_3$. Similarly, more heat would be evolved if the iron entered the oxidizer as FeO and was oxidized to $Fe_3O_4$ and $Fe_2O_3$. For operation of this system, it is not necessary to reduce the iron completely to metallic iron in methane oxidizer 16. However, the preferred conditions are such in the methane oxidizer 16 that the iron oxide will be reduced completely or almost completely to metallic iron before being returned to catalyst oxidizer 29. The spent catalyst, which is returned to catalyst oxidizer 29 from the synthesis reactor 54 and spent catalyst separator 63, will usually be in the form of iron or iron carbide and will also contain a certain amount of wax or heavy carbonaceous material, which material will be removed by oxidation in catalyst oxidizer 29. The oxidation of iron to iron oxide or of a lower oxide to a higher oxide will be a rapid reaction and it is also probable that at the high temperatures maintained in catalyst oxidizer 29, the carbon on the spent catalyst will be oxidized very rapidly, 10 to 15 seconds average contact time of the gas being ample for both these purposes. The superficial gas velocity will preferably be of the order of about 1 to about 1.5 feet per second, so as to reduce the carry-over of catalyst to the solids separator 37 as much as possible.

A gaseous mixture of the products of methane oxidizer 16 and recycle gas containing entrained hydogenation catalyst is continuously passed through conduit 51, a cooler 52, and conduit 53 to a conventional upflow type synthesis reactor 54. In cooler 52 the gaseous mixture, which contains suspended hydrogenation catalyst, is cooled to a temperature of about 600° F. to about 300° F. by indirect contact with a varporizable liquid, such as water. The mol ratio of hydrogen to carbon monoxide of the effluent of oxidizer 16 is about 2:1 which corresponds to the ratio of hydrogen to carbon monoxide produced by the conversion of methane with the metal oxide. This ratio of hydrogen to carbon monoxide may be somewhat lower than 2:1 as a result of the conversion of $CO_2$ and methane to carbon monoxide and hydrogen, since hydrogen and carbon monoxide are produced in a mol ratio of about 1:1 in this reaction. The ratio of hydrogen to carbon monoxide in synthesis reactor 54 may be altered to values above or below the aforementioned ratios by recycling unconverted hydrogen and carbon monoxide, such as through line 86. If desired, also, hydrogen, and/or carbon monoxide may be introduced into conduit 51 from an outside source (not shown) without departing from the scope of this invention.

When using a reduced iron catalyst in reactor 54 for the conversion of the carbon monoxide and hydrogen to organic compounds, a temperature between about 350° F. and about 750° F. is used, preferably a temperature between about 400° F. and about 600° F. The velocity of the gaseous mixture passing upward through reactor 54 is between about 0.5 and about 6 feet per second, preferably about 1.5 feet per second, in order to maintain the finely divided catalyst therein in a pseudo-liquid condition. Numeral 56 indicates the interface between a pseudo-liquid dense phase and a dilute phase of catalyst in reactor 54 similar to that described with reference to methane oxidizer 16. The reaction pressure is between about atmospheric and about 500 pounds per square inch gage, and preferably substantially the same as or lower than the reaction pressure in catalyst oxidizer 29 and methane oxidizer 16. From mechanical considerations, pressures lower than about 250 pounds per square inch gage are desirable, such as 80 or 100 pounds per square inch gage. The space velocity in reactor 54 is equivalent to a charging rate of at least 1 standard cubic foot of carbon oxide, per hour, per pound of synthesis catalyst in the dense phase. At the preferred gas velocities and when employing an iron catalyst, the minimum space velocity may be defined as 100 volumes of carbon monoxide (measured at standard conditions), per hour, per volume of the dense phase of catalyst when fluidized in the fresh condition. The absolute space velocity of the charge gas is determined by dividing the carbon monoxide space velocity by the volumetric fraction of the charge gas represented by carbon monoxide.

Catalyst may be withdrawn continuously or intermittently from the pseudo-liquid phase of synthesis reactor 54, such as by means of standpipe 57, and may be passed to conduit 26 through conduit 58 for regeneration by oxidation, or catalyst may be passed directly to conduit 51. In the latter manner, at least a sufficient amount of catalyst is withdrawn from reactor 54 and cooled in cooler 52 such that the temperature of reaction in reactor 54 may be maintained substantially constant. In other words, sufficient sensible heat is removed from the catalyst in cooler 52 to at least partially compensate for the exothermic heat of reaction in reactor 54.

If insufficient catalyst is supplied to reactor 54 in the synthesis gas stream passing through conduit 19 to conduit 51, additional catalytic material may be withdrawn continuously or intermittently directly from the catalyst dense phase of methane oxidizer 16 through a conduit or standpipe 60 and introduced by gravity into conduit 51.

When catalyst is introduced into conduit 51 through conduits 60 and 57, the quantity of synthesis feed and recycle gas passing through line 51 may be insufficient to maintain a velocity sufficient to suspend or entrain the catalyst and pass the catalyst through cooler 52. In order to eliminate the difficulty of carrying the catalyst through conduit 51 and to minimize the tendency of the catalyst or other finely divided solid material to agglomerate and settle in conduit 51 or cooler 52, according to a modification of this invention, a vaporizable liquid is introduced into conduit 51 through inlet conduit 55 at a point preceding or adjacent to the introduction of the catalyst from conduits 57 and 60. Such a vaporizable liquid comprises water or a hydrocarbon fraction or any suitable liquid which is not detrimental to the hydrogenation reaction under the conditions in reactor 54. A suitable liquid for this purpose is the aqueous condensate recovered as a reaction by-product. Another suitable liquid is a normally liquid hydrocarbon fraction, such as light naphtha fraction boiling in the range between about 80° F. and about 195° F. Other normally liquid hydrocarbon fractions comprise either a butane or a pentane fraction or may even comprise an oxygenated organic fraction, such as an alcohol fraction. The injection of a vaporizable liquid into the effluent in conduit 51 also aids in cooling the effluent to a sufficiently low temperature prior to entry into reactor 54. If sufficient cooling is effected in this manner cooler 52 may be omitted entirely.

Synthesis reaction effluent comprising organic compounds, unreacted carbon monoxide and/or hydrogen, and entrained finely divided solids are removed from the upper portion of synthesis reactor 54 through conduit 61 and are passed to a catalyst separator 63. Catalyst separator 63 may comprise a cyclone separator or a Cottrell precipitator or any conventional means for separating finely divided entrained solids from the reaction effluent. Finely divided catalyst which has been separated from the reaction effluent in separator 63 is collected in standpipe 65 and is introduced into conduit 26 for return to catalyst oxidizer 29 where it is re-oxidized. A portion of the reaction effluent prior to condensation may be recycled directly through conduit 62 to conduit 51 by means of a compressor or blower (not shown) and thence back to reactor 54, if desired.

Recycling a portion of the reaction effluent prior to condensation may aid in the control of the temperature in reactor 54 as well as the mol ratio of hydrogen to carbon monoxide in the reaction mixture therein.

The reaction effluent substantially free from entrained catalyst is removed from separator 63 through conduit 64 and passed through a conventional steam generator or a waste heat boiler 66 and a condenser 67 to accumulator 68. Condenser 67 may comprise a single or a series of condensation units and is maintained at a temperature of about 200° F. or lower. In accumulator 68 which is at a temperature corresponding substantially to the outlet temperature in condenser 67, an aqueous-rich liquid phase 71 and a lighter hydrocarbon-rich liquid phase 69 are formed. The aqueous liquid phase is withdrawn from accumulator 68 through conduit 72 for disposal or recovery of dissolved oxygenated organic compounds by means not shown. Uncondensed vapors and the hydrocarbon-rich liquid phase are withdrawn from accumulator 68 through conduits 73 and 74, respectively, and after compression (not shown) are passed through conduit 76 and a conventional cooler 77 to a second accumulator 78 maintained at a pressure higher than that existing in conduit 76 to Cooler 77 cools the mixture in conduit 76 to about atmospheric temperature. Condensate is removed from accumulator 78 through conduit 79. Condensate in conduit 79 comprises hydrocarbons having more than about 3 carbon atoms per molecule and some oxygenated organic compounds. The mixture is passed through conduit 79 to a conventional separation and purification system (not shown) for the recovery of the components of the mixture as products of the process by such unit processes as distillation, absorption, extraction, etc. A gaseous phase comprising hydrogen and/or carbon monoxide, methane, $C_3$ hydrocarbons, and some $C_4$ hydrocarbons is removed from accumulator 78 through conduit 81 and is passed to an absorber 82. In absorber 82 the gaseous mixture passes upward countercurrent to a downward flowing liquid, such as mineral seal oil, at a temperature of about 100° F. and a pressure substantially equivalent to that prevailing in accumulator 78 under conditions such that substantially all of the propylene, propane, and heavier hydrocarbons are absorbed and removed from the gaseous stream. The absorption oil rich in propane is removed from absorber 82 through conduit 84 and is passed to a stripping chamber (not shown) for stripping of the absorbed hydrocarbons from the absorption oil. The stripped absorption oil is recycled to absorber 82 through conduit 83. A gaseous mixture comprising unreacted hydrogen or carbon monoxide, or both, together with methane, ethylene, and ethane is removed from absorber 82 through conduit 86 and according to a modification of this invention is recycled to synthesis reactor 54 through conduit 51 and to methane oxidizer 16 through conduit 14.

Any remaining recycle gas not returned to units 16 and 54 from conduit 86 may be passed through conduit 87 to combustion chamber 91, where methane, ethane, and any carbon monoxide and hydrogen are oxidized with air entering through conduit 89. The heat generated by this combustion is carried as sensible heat in the combustion effluent from chamber 91 to catalyst oxidizer 29 through conduit 92. The heat thus produced aids in maintaining the temperature in catalyst oxidizer 29 at the desired level and provides an effective means for utilizing excess recycle gas by recovering its heating value. When starting up the system, a substantial portion of the methane stream must be burned in combustion chamber 91 in order to bring the catalytic material in catalyst oxidizer 29 to the desired temperature. Methane may be introduced into combustion chamber 91 by by-passing a portion of the methane feed in conduit 9 through conduit 88 to conduit 87, as shown. After the catalytic material in oxidizer 29 has been brought to the desired temperature, the amount of recycle gas and/or methane burned in combustion chamber 91 may be reduced or even eliminated entirely.

Preferably, the powdered solid material used as the catalyst or the heat carrying material in the various reaction zones initially contains no more than a minor proportion by weight of material whose particle size is greater than about 250 microns. Preferably, also, the greater proportion of the solid mass comprises material whose particle size is smaller than 100 microns, including at least 25 weight per cent of the material in particle sizes smaller than 40 microns. A highly desirable powdered solid material which can be suspended in a fluidized condition in a gaseous mixture comprises at least 75 per cent by weight of material smaller than 150 microns in particle size and at least 25 per cent by weight smaller than 40 microns in particle size.

The catalyst employed in the present invention is a finely divided powder comprising a metal and/or metal oxide, such as a metal of group VIII of the periodic table, which is or becomes in the synthesis reaction zone a catalyst for the hydrogenation of the oxide of carbon. The preferred catalyst of this invention for the reaction of carbon monoxide and hydrogen comprises elementary iron but it may comprise a mixture of elementary iron and the various oxides of iron in the various ratios. It may also comprise one of the lower oxides of iron alone or in mixture with other materials, such as conventional promoters and supports. Cobalt and nickel in either the form of an oxide or in the form of an elementary metal may also be used as a catalyst in the present invention. Thus, in catalyst oxidizer 29 the cobalt and nickel will be in the form of an oxide and will be reduced in methane oxidizer 16 to a lower oxide or to the elementary metal which is then passed to reactor 54.

An oxide of copper, such as CuO, may also be used as the oxygen supplying material for the methane oxidation reaction in oxidizer 16. When an oxide of copper is used for this purpose substantially lower temperatures may be used than with such oxides as iron oxide. With a copper oxide, a temperature as low as 500° F., preferably not lower than about 600° F. or about 700° F., may be employed for the oxidation of methane. Reduced copper-containing material is removed from methane oxidizer 16 and passed to catalyst oxidizer 29 in which the material is oxidized at a temperature as low as about 600° F. Finely divided reduced copper-containing material carried overhead in the effluent from methane oxidizer 16 passes through conduits 19 and 51 to synthesis reactor 54 where it acts as a catalyst or as a promoter for the hydrogenation reaction. Copper oxide may conveniently be used in admixture with other metals or metal oxides, such as iron or an iron oxide. When a mixture of copper oxide and iron or an iron oxide is employed, the copper oxide may serve as the chief source of oxygen for the oxidation of methane in oxidizer 16 and the iron or iron oxide may serve as the catalytic material for the hydrogenation of carbon monoxide in synthesis reactor 54. When operating with a copper oxide at the relatively low temperatures, it may be unnecessary to cool the effluent from reactor 16 prior to introduction into synthesis reactor 54. Copper-containing material is recycled from reactor 54 or separator 63 to catalyst oxidizer 29.

Since as previously indicated a considerable amount of heat must be supplied to methane oxidizer 16, this heat is conveniently supplied from catalyst oxidizer 29 by absorbing the bulk of the exothermic heat liberated therein in the solid material and by transferring this heat as sensible heat in the solid material to the methane oxidizer 16. This is accomplished by passing finely divided solid material from catalyst oxidizer 29 through conduits 12 and 14 to methane oxidizer 16 wherein the solid material liberates a portion of its sensible heat. Part of the heat contained in the gases leaving reactor 24 can also be recovered by heat exchange with the incoming methane and recycle gas in exchanger 33. The amount of solid material which must be circulated from reactor 29 to reactor 16 to furnish oxygen for the oxidation of the methane is relatively small compared with the amount of solid material which must be circulated to furnish heat. This latter amount will depend to a great extent on the temperature differential between reactor 29 and reactor 16, and is at least 5 times and may be 40 times as great as the weight of that material which must be circulated to supply oxygen. In view of this fact, a substantial portion of the catalyst material may conveniently comprise solid inert material, such as a carrier upon which the catalytic material may be precipitated or with which the catalytic material may be fused, or the catalytic material may be admixed with a substantially inert material in finely divided form, such as alumina, silica, magnesia, bauxite, bentonite type clays, sand, or other heat carrier materials. The desirability of having a large proportion of diluent or carrier present in the catalytic material renders the process suitable for the use of cheap natural catalysts which contain originally a major proportion of inactive material. Such a catalyst comprises a natural montmorillonite type clay, such as Ittawamba clay, which contains about 5 weight per cent $Fe_2O_3$ and about 1.3 weight per cent $TiO_2$. A montmorillonite type clay may also be used as a support for impregnated or precipitated catalytic material, since it is suitable as a heat carrier material and has desirable flow characteristics for use in systems of the type described.

In order to render the ferruginous material in the natural montmorillonite type clay particularly active as a catalytic agent for the synthesis of hydrocarbons, the montmorillonite type clay may be treated with hydrogen sulfide under atmospheric conditions of temperature and pressure to convert the ferruginous material to the sulfide. The treated clay is then roasted in air at atmospheric pressure or higher and at about 1000° F. to about 1400° F. at which temperature the sulfide is converted to the oxide. The catalyst is then introduced into the system through conduit 11 and becomes reduced to the metallic iron or one of the lower oxides in methane oxidizer 16. If desired, the roasted clay may be reduced with hydrogen at a temperature of about 1400° F. and then introduced directly into synthesis reactor 54 as a catalyst. The use of such iron containing clays as a catalyst is made possible by the fact that the process of this invention requires either the use of a catalyst containing a large proportion of inert material or the use of an excess quantity of catalyst as a heat carrier. The use of such clays as a source of catalytic material constitutes a substantial economic advantage of the present process over conventional processes for the synthesis of hydrocarbons, since the ferruginous material in the clay, which is normally considered to be an undesirable impurity, is catalytically active for the hydrogenation reaction and the methane oxidation step of the present process.

A gaseous mixture is passed upwardly through the mass of finely divided material in catalyst oxidizer 29, methane oxidizer 16, and synthesis reactor 54, at a velocity sufficient to suspend or entrain the mass of finely divided solids in the gaseous stream. Preferably, the velocity of the gas stream flowing upwardly in the aforesaid reaction zones is sufficiently low to maintain the mass of finely divided solids in a dense fluidized pseudo-liquid condition. However, the velocity may be sufficiently high to entrain at least a substantial portion of the finely divided solid in the gaseous stream to form a continuous fluidized solids phase which circulates with the flowing gas stream without departing from the scope of this invention. In the former condition the mass of solids may be said to be suspended in the gas stream but not entrained or carried therein in the sense that there is movement of the mass as such in the direction of flow of the gas stream. When operating with the finely divided solids in the pseudo-liquid condition, it is preferred to maintain the upward velocity of the gaseous stream sufficiently high to maintain the fluidized mass of solids in a highly turbulent condition in which the finely divided solid particles circulate at a high rate in a stationary pseudo-liquid mass. In this pseudo-liquid condition of operation a small proportion of the finely divided solids may become entrained in the gaseous stream emerging from the upper surface of the pseudo-liquid mass whereby material thus entrained is carried away from the mass with the effluent gas. Such finely divided solids carried away with the effluent must be recovered from the effluent and recycled or fresh finely divided solids added to the system to make up for the loss by entrainment.

As used herein, suspension of the finely divided solids refers to the condition of the mass either when it is in a pseudo-liquid condition above described or when it is entrained in the gaseous reaction mixture such that the finely divided solid is carried along with the gases in the reaction zone.

In the preferred form of the invention with the catalytic material present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude.

than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. This superficial velocity is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of solids in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

This operation ordinarily involves employment of catalyst powders and gas velocities such that a relatively small proportion of the dense fluidized catalyst mass is carried away by entrainment, and it is necessary, therefore, to provide means in the reactor for separating such entrained solids and returning them to the dense phase, or to provide means externally of the gas reactor to separate entrained solids from the gas stream and return them to the reactor, or otherwise to recover finely divided solids from the product gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form comprising ferruginous material and containing at most minor proportions of promoting agents, such as potassium oxide or other alkali metal or alkaline earth compounds, provides very high concentrations of solids in the reaction zone. The employment of the finely powdered solids in a fluidized bed with efficient direct or indirect cooling means also is a factor in permitting a high rate of reaction and concentration of reactants, since it facilitates the rapid removal of heat from all portions of the reaction zone. The pseudo-liquid operation, employing the finely divided solids, results in concentrations of solids of at least about 15 pounds per cubic foot of the fluidized dense phase, while the preferred gas velocities result in initial concentrations of 40 to 120, or more, pounds per cubic foot of dense phase. It will be understood that these figures refer to the initial average concentration in the dense phase. The accumulation of reaction products on the solid particles as the operation proceeds reduces the density of the solids and increases the bulk of the dense fluidized mass.

The linear velocity of the gas stream passing upwardly through the dense phase is conveniently expressed in terms of the superficial velocity, which is the linear velocity the charge gas stream would assume if passed through the reactor at operating conditions in the absence of catalyst and takes into account the shrinkage in volume caused by the reaction, and is, preferably, in the range of from 0.1 to 6 feet per second. When operating with a continuous catalyst phase in which the catalyst is entrained in the flowing gaseous mixture, velocities as high as 40 or 50 feet per second may be used without departing from the scope of this invention.

The synthesis reactants are passed into and through the synthesis reaction zone 54 at a space velocity equivalent to a charging rate of at least 0.5 standard cubic foot of the carbon oxide, per hour, per pound of metal catalyst in the dense catalyst phase. In the hydrogenation of carbon monoxide with a catalyst comprising reduced iron, it is preferred to operate at a space velocity equivalent to a charging rate of at least 2.0 standard cubic feet of carbon monoxide per hour, per pound of reduced iron in the dense catalyst phase. The charging rate is defined by reference to the carbon monoxide reactant, since the ratio of the hydrogen reactant to the carbon monoxide reactant in the charge gas may vary within wide limits.

As used herein, pressures are expressed as pounds per square inch gage and volumes are expressed as cubic feet at standard conditions of 60° F. and 760 mm. pressure.

According to the preferred embodiment of this invention a synthesis feed gas containing hydrogen and carbon monoxide in a mol ratio of about 2:1 is processed under conditions effective to react all or a major proportion of the carbon monoxide, and a portion of the product mixture after removal of the greater part of the liquid product, is recycled in a volumetric ratio to the fresh feed gas of about 0.5:1 to about 10:1, as a result of which the mol ratio of hydrogen to carbon monoxide in the reaction zone itself may be substantially higher than 2:1, and as high as about 5:1 or higher.

It is preferred to operate synthesis reactor 54 at whatever temperature level, in the range of about 350° F. to about 750° F., is necessary to effect high conversion of carbon monoxide when treating a gas charge containing at least about 1:1 ratio of hydrogen to carbon monoxide at a space velocity equivalent to a charging rate at least about 1.0 standard cubic foot of carbon monoxide, per hour, per pound of iron catalyst in the dense phase. Similarly, it is preferred to operate the methane oxidizer at whatever temperature level in the range of 500° F. to about 1700° F. is necessary to effect high conversion of methane to carbon monoxide and hydrogen. The oxidation of the ferruginous material in the catalyst oxidation zone is carried out at as high a temperature as is permissible and at a temperature above the temperature of the methane oxidizer. Usually, a temperature of at least about 200° F. to about 500° F. or higher above the temperature in the methane oxidizer is maintained in the catalyst oxidizer.

In high velocity continuous phase systems in which the reactant gas is passed through the reaction zones at a linear velocity in excess of 6 to 10 feet per second, additional means must be supplied for removing the bulk of the catalyst or solid material from the reaction effluent. Thus, a settling zone (not shown) may be located in conduits 19, 32, and 61, in which settling zones the bulk of the entrained solid material is separated from the effluent and recycled to the respective reaction zones. Of course, means must still be provided when necessary to remove the small proportion of entrained fine solids after separation of the bulk of the solid material from the effluent, such means being illustrated in Figure 1 by separators 37 and 63. The solids separated in separators 37 and 63 are circulated as previously described and shown.

Since the catalytic material undergoes treatment in catalyst oxidizer 29 at a relatively high temperature, the loss of promoters, such as potassium oxide, from the catalyst by vaporization may be considerable, additional promoter may be injected directly into reactor 54 by means not shown. For example, potassium carbonate is dissolved in water and the resulting solution is injected into conduit 51 or reactor 54 in an amount sufficient to compensate for the loss of potassium promoter from the catalyst in catalyst oxidizer 29. Conveniently, potassium carbonate may be dissolved or suspended in the vaporizable liquid introduced into conduit 51 through conduit 55. The vent gases leaving catalyst oxidizer 29 can be cooled and scrubbed with water to recover the volatilized potassium oxide, which can be returned to reactor 29.

Although the present invention has been described specifically with reference to the oxidation of methane to produce a suitable synthesis feed gas, other hydrocarbons may be oxidized to products, such as carbon monoxide and hydrogen, which are subsequently interacted to form hydrocarbons and oxygenated organic compounds having more carbon atoms per molecule than the feed hydrocarbons. Such feed hydrocarbons comprise ethylene, ethane, propylene, and propane.

Although the conditions of reaction in the various reaction zones are those which are preferred, using the catalytic materials indicated, other reaction conditions and other catalytic materials may be employed in the process without departing from the scope of this invention.

Figure 2 diagrammatically illustrates a modification of the present invention in which the catalyst is oxidized in a high velocity continuous phase reactor. According to the modification of Figure 2, which will only be discussed briefly, methane is passed through conduit 14 and heat exchanger 33 to methane oxidizer 16 in a similar manner as described with reference to Figure 1. Finely divided contact material comprising a metal oxide is maintained in a pseudo-liquid fluidized condition in reactor 16 and forms an interface 17 between a lower dense phase and an upper dilute phase of contact material. The methane oxidation effluent is removed from reactor 16 through conduit 19 and passed through heat exchanger 21 to synthesis reactor 54 of Figure 1.

Finely divided contact material comprising reduced catalytic material is withdrawn from the dense phase of methane oxidizer 16 through standpipe 18. Preheated air from conduit 27 picks up the finely divided contact material from standpipe 18 and the resulting mixture passes to a catalyst oxidation chamber 94 where the reduced contact material is oxidized. Catalyst oxidation chamber comprises an elongated chamber of such cross sectional area that the velocity of the gases passing therethrough are sufficiently high that the contact material is carried or entrained in the flowing gases. Section 95 of the reactor 94 comprises a chamber of increased cross sectional area for the purpose of allowing a sufficient residence time of catalyst and gases to effect the desired reaction. Section 95, however, is of such size that the gas is at a velocity sufficient to entrain the contact material therein. The velocity of the upward flowing gases in reactor 94 and reactor 95 is above about 6 feet per second, usually about 10 feet per second, sufficiently high such that the so-called pseudo-liquid dense phase of finely divided solids is not formed. The temperature of reactor 94 is within the ranges previously disclosed, usually about 1850° F. Additional heat may be supplied to reactor 94 by passing gases at a high temperature into reactor 94 through conduit 92 as described with reference to Figure 1. The oxidation reaction may be accurately and conveniently controlled in reactor 94 by regulating the velocity of the gases passing therethrough, since the residence time of the contact material in reactor 94 is a function of the gas velocity. The gaseous mixture containing the entrained oxidized contact material passes from reactor 94 to a separator 96, which may comprise a cyclone separator or other means for separating the entrained contact material from the gases. Separated contact material from separator 96 is collected in standpipe 97 through which it is returned to methane oxidizer 16.

The gaseous effluent from catalyst oxidizer 94 is passed from separator 96 through conduit 32, heat exchanger 33, and cooler 36 to a second separator 37. Separator 37 may comprise a cyclone separator or a Cottrell precipitator. Entrained finely divided contact material is separated from the effluent in separator 37. The effluent substantially free from solids is vented to the atmosphere through conduit 38. Separated contact material is returned to reactor 94 through conduits 39 and 28 in a similar manner as described with reference to Figure 1.

Additional air may be introduced into reactor 94 through conduit 26. The only mechanical control necessary for regulating catalyst flow between the catalyst oxidation chamber 94 and methane oxidation chamber 16 is a valve on standpipe 18. Instead of a cyclone separator, a water scrubber may be used to remove entrained finely divided solids from the gases in conduit 32. Water containing the solids recovered from the gases in conduit 32 may be returned directly to oxidizer 94 where the water is vaporized. The vaporized water is condensed from the oxidation effluent by means of cooler 36 and is then returned to the scrubber.

Figure 3 of the drawings diagrammatically illustrates a modification of the present invention when the hydrogenation of carbon monoxide is carried out at a pressure higher than the pressure existing in methane oxidizer 16 of Figure 1. In this modification the synthesis feed mixture from methane oxidizer 16 of Figure 1 is passed through conduit 51 to a catalyst-scrubber 101, in which scrubber finely divided entrained catalyst, such as reduced iron, is removed from the feed mixture by washing or scrubbing the gaseous mixture with a liquid medium introduced into scrubber 101 through conduit 102. The liquid medium comprises any suitable liquid scrubbing medium which is capable of removing solid material from the gaseous effluent and is substantially non-reactive with the reactants in the gaseous mixture. Such a medium may conveniently comprise a hydrocarbon fraction recovered as a product of the hydrogenation reaction. The synthesis feed gas, which is effluent gas from methane oxidizer 16 and recycle gas, is usually at a pressure below about 100 pounds per square inch gage when this modification is used and must be compressed to a pressure between about 300 and about 600 pounds per square inch gage, preferably, about 400 pounds per square inch gage. In order to compress the feed gas mixture containing hydrogen and carbon monoxide, the entrained catalyst must be removed from the feed gas. This is accomplished in scrubber 101.

Synthesis feed gas comprising hydrogen and carbon monoxide in a mol ratio of about 2:1 and substantially free from entrained catalyst is removed from scrubber 101 through conduit 105 and is continuously passed to synthesis reactor 113 by means of compressor 111.

Scrubber 101 comprises an elongated cylindrical chamber having baffles or plates 103 therein for diverting the flow of the liquid scrubbing medium and the upward flowing gas mixture therein. The scrubbing medium introduced through conduit 102 in the upper portion of scrubber 101 continuously passes downward and countercurrent to the upward flowing synthesis gas mixture and collects in the lower portion thereof as indicated by numeral 104. The liquid scrubbing medium, preferably in this case a hydrocarbon fraction recovered as a product of the process, contains substantially all of the entrained catalyst and is withdrawn from scrubber 101 through conduit 107. The scrubbing medium containing the entrained catalyst may be recycled to scrubber 101 through conduit 108 and cooler 109. Scrubber 101 also cools the synthesis gas to the desired temperature of synthesis reactor 113 or lower. Sensible heat removed from the synthesis gas in scrubber 101 by the scrubbing liquid is removed by cooler 109 from the scrubbing liquid prior to reintroduction into scrubber 101. Fresh scrubbing medium may be introduced into scrubber 101 through conduit 102, when necessary. A portion of the scrubbing medium is diverted from conduit 107 and passed through conduits 110 and 114, and cooler 122, to synthesis reactor 113. The passage of at least a portion of the scrubbing liquid from scrubber 101 to synthesis reactor 113 supplies make-up catalyst in reactor 113 since the scrubbing liquid contains all of the entrained catalyst from the synthesis gas in addition to the catalyst introduced from line 60. Scrubbing medium is introduced into the upper portion of reactor 113 through conduit 114 and flows downward against baffles 116 countercurrent to the upward flowing mixture of hydrogen and carbon monoxide. The scrubbing liquid or hydrocarbon fraction collects in the lower portion of reactor 113, as indicated by numeral 117. This scrubbing liquid or hydrocarbon fraction comprises the heavier products of the process which condense in reactor 113 under the conditions of temperature and pressure maintained therein. Synthesis feed gas is introduced into the liquid phase 117 of reactor 113 through conduit 105 and dispersion means 112 which may comprise a suitable perforated conduit or nozzles. If desired, a portion or all of the synthesis gas may be introduced above the liquid phase through conduit 106, as shown. When introduced through conduit 106, the synthesis gas is absorbed in the hydrocarbon fraction 117 and the synthesis reaction is catalyzed by the suspended catalyst in the liquid. A temperature between about 250° F. and about 500° F. is maintained in reactor 113. For effective catalyzation of the carbon monoxide and hydrogen reaction, the liquid phase 117 should contain between about 0.5 and about 3 pounds of suspended catalyst per gallon of liquid, preferably, 1 pound of suspended catalyst per gallon of hydrocarbon liquid.

Hydrocarbon liquid is removed from reactor 113 through conduit 118 for continuous recycling to the upper portion of reactor 113 through conduits 110, 114, and cooler 122. Cooler 122 removes sensible heat from the hydrocarbon liquid and thereby aids in the control of the temperature in reactor 113. A portion of the catalyst may be withdrawn through conduit 146 and passed to filter 147 in which suspended catalyst is removed from the liquid medium. Filter 147 comprises any conventional type of separating means or filter press for separating suspended solids from a liquid. Filtered catalyst is removed from filter 147 through conduit 149 and is introduced into catalyst oxidizer of Figure 1 by means of conduit 26 through which air is flowing. Catalyst may be introduced into conduit 26 by any suitable means, such as a standpipe or a Fuller Kinyon pump (not shown). The catalyst in catalyst oxidizer 29 is oxidized as previously discussed with reference to Figure 1 and eventually it is recycled with the synthesis feed gas to reactor 113. A liquid hydrocarbon fraction substantially free from suspended catalyst is removed from filter 147 through conduit 148 and may be recovered as a product of the process through conduit 144. A portion of the liquid phase 117 of reactor 113 must be continuously or intermittently withdrawn from the system as a product of the process since the quantity of liquid in reactor 113 increases as a result of the reaction of carbon monoxide and hydrogen to produce liquid hydrocarbons therein.

A gaseous effluent is continuously withdrawn from reactor 113 through conduit 119 and is passed to an accumulator 124 after passing through a condenser 123. Condenser 123 may comprise any suitable heat exchange or cooling means, either as a single unit or as a series of units. The gaseous effluent in conduit 119 is cooled to about 150° F. or lower by cooler 123, preferably to a temperature of about 100° F. Two liquid phases are formed in accumulator 124 which is at substantially the same pressure as reactor 113; one liquid phase 126 comprises a hydrocarbon-rich phase and the other liquid phase 127 comprises an aqueous-rich phase. At least a portion of the hydrocarbon-rich liquid phase 126 is removed from accumulator 124 through conduit 128 and is continuously or intermittently recycled to the upper portion of reactor 113. In this manner, the recycled oil is vaporized which vaporization aids in the control of the reaction temperature in reactor 113. The return of the liquid hydrocarbon phase from accumulator 124 also results in a substantial increase in the amount of higher boiling hydrocarbons produced and creates an equilibrium in reactor 113 in the production of the hydrocarbons represented by the composition of the fraction returned through conduit 128 such that a minimum amount of relatively low boiling hydrocarbons are produced. If desired, a portion of the light hydrocarbons from accumulator 124 may be withdrawn therefrom through conduit 129 and recovered as a product of the process by a subsequent purification and separation system (not shown). The aqueous-rich liquid phase 127 of accumulator 124 is withdrawn through conduit 131 and may be passed to a conventional separation and purification system (not shown) for the recovery of water soluble oxygenated organic chemicals, which may comprise valuable products of the process. Such water soluble oxygenated organic compounds produced by the hydrogenation of carbon monoxide in the present process comprise alcohols, ketones, aldehydes, etc.

In a modification of the liquid phase process described in Figure 3, preferably at least a portion of the liquid phase in reactor 113 is withdrawn therefrom through conduit 136 and passed through a conventional cooler 137 to a settler 138 which is at a slightly higher pressure than scrubber 101 which in turn is at substantially the same pressure as reactor 16 of Figure 1. In settler 138 the liquid separates from the uncondensed gases which are released as a result of the reduction in pressure from reactor 113 to settler 138. The liquid phase 139 of settler 138 comprises a slurry of solids and liquid organic compounds. On standing in settler 138, the solids settle to the bottom as a heavy slurry in liquid hydrocarbon and are withdrawn through conduit 142 and introduced into conduit 110 for return to the reactor 113 through conduits 110 and 114. Liquid withdrawn from the upper level of the liquid phase 139 through 143 will be relatively free of suspended solids and is either passed to scrubber 103 through conduit 143 or removed from the system through conduit 144. Uncondensed gases are withdrawn from settler 138 through conduit 141 and introduced into the synthesis feed gas in conduit 105 for return to reactor 113. This modification may be omitted, if desired; however, it does comprise a convenient method for supplying and regulating the composition of the scrubbing medium to scrubber 101.

In the liquid phase process of Figure 3 the catalyst is substantially the same in composition and in size as that used in the vapor phase process described with reference to Figure 1 and further discussion thereof is deemed unnecessary. Preferably, the space velocity of the gaseous feed mixture introduced into reactor 113 is between about 25 and about 250 volumes per hour per volume of catalyst suspended in the liquid medium of reactor 113.

Although a reduced iron catalyst was specifically described in the discussion of Figures 1, 2, and 3, another suitable catalyst comprises a cobalt-thoria catalyst. Using a cobalt catalyst in the vapor phase of Figure 1, the synthesis reaction is carried out at a temperature below about 450° F. In the liquid phase process of Figure 3, using a cobalt catalyst, the synthesis reaction is carried out at a temperature between about 300° F. and about 450° F., usually at a temperature above about 400° F. In both vapor and liquid phase processes for the synthesis of hydrocarbons, 90 to 100 per cent conversion of carbon monoxide is realized with the production of high yields of hydrocarbons having more than one carbon atom per molecule and oxygenated organic compounds.

In the operation of the modification shown in Figure 3, the flow of liquid through conduit 136 may be maintained constant and the quantity of liquid withdrawn from the system through conduit 146 may be regulated by a conventional flow control valve responsive to the liquid level in reactor 113 in order to maintain a constant liquid level therein. Alternatively, the amount of liquid withdrawn from the system through conduit 146 may be maintained constant and the amount of liquid flowing through conduit 136 may be responsive to the liquid level in reactor 113. The rate of circulation of liquid through conduit 114 depends on the amount of heat required to be removed from reactor 113 to control the temperature therein.

*Example*

The following example is offered as a means of better understanding the present invention, particularly as to the catalyst oxidation step and the methane oxidation step. The example illustrates specific operating conditions for the production of approximately 1,000,000 cubic feet per hour of synthesis feed gas.

Approximately 14,860 pounds per hour of methane is passed to a methane oxidation zone. Simultaneously, approximately 63,780 pounds per hour of air is passed to a catalyst oxidation zone. The methane at a temperature of about 80° F. is heat exchanged with the effluent from the catalyst oxidation zone and is thereby pre-heated to a temperature of about 1650° F. prior to introduction into the methane oxidation zone. In the methane oxidation zone iron oxide, such as $Fe_3O_4$, is reacted with methane according to the following typical equation to produce carbon monoxide and hydrogen:

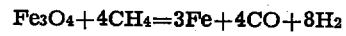
$$Fe_3O_4 + 4CH_4 = 3Fe + 4CO + 8H_2$$

Since the oxidation of methane is an endothermic reaction, approximately 100,100,000 B. t. u.'s per hour are required for this reaction which heat is supplied from the sensible heat of the incoming methane and solid material. The reaction effluent containing carbon monoxide and hydrogen at a temperature of about 1650° F. is removed from the methane oxidation zone and heat exchanged with the air entering the system. The heat exchange with the air cools the reaction effluent from about 1650° F. to about 600° F. with the removal of about 21,570,000 B. t. u.'s of heat per hour. In this manner the air which enters at a temperature of about 110° F. is preheated to about 1435° F. prior to introduction into the catalyst oxidation zone. Iron oxide and heat carrier material of a finely divided form are maintained in a pseudo-liquid dense phase condition in the methane oxidation zone at an upward linear gas velocity therein of about 1.5 feet per second.

Approximately 38,910 pounds per hour of iron and approximately 1,802,670 pounds per hour of inert heat carrier material are removed from the methane oxidation zone and passed to the catalyst oxidation zone. This finely divided solid material removed from methane oxidation zone is at a temperature of approximately 1650° F. and is passed from methane oxidation zone to the catalyst oxidation zone by means of the preheated air. In the catalyst oxidation zone the iron is oxidized with a liberation of approximately 106,500,000 B. t. u.'s per hour of heat. The reaction temperature in the catalyst oxidation zone is about 1850° F. The iron is oxidized according to the following typical equation:

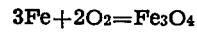
$$3Fe + 2O_2 = Fe_3O_4$$

A reaction effluent comprising 48,960 pounds per hour of nitrogen at a temperature of 1850° F. is removed from the catalyst oxidation zone. This effluent is heat exchanged with the incoming methane whereby the effluent is cooled to a temperature of about 307° F. with a transfer of about 20,450,000 B. t. u.'s of heat per hour. The finely divided iron-containing material and inert heat carrier are maintained in a pseudo-liquid fluidized condition in the catalyst oxidizer at an upward linear gas velocity therein of about 1.5 feet per second.

Approximately 53,770 pounds per hour of $Fe_3O_4$ and approximately 1,802,670 pounds per hour of heat carrier material are removed from the pseudo-liquid dense phase of the catalyst oxidation zone at a temperature of about 1850° F. and introduced into the methane feed stream. The resulting mixture of heat carrier, iron oxide and methane is then transferred to the methane oxidation zone and the cycle is repeated.

Under the above specific conditions of operation, 1,000,000 cubic feet per hour of synthesis feed gas is produced containing approximately 26,000 pounds per hour of carbon monoxide and about 3,720 pounds per hour of hydrogen. This gaseous effluent at a temperature of approximately 600° F. is then passed to a synthesis reaction zone under conditions suitable for the production of hydrocarbons and oxygenated organic compounds. The effluent contains finely divided entrained solid material comprising iron in amounts sufficient to supply the make-up catalytic material for the synthesis reaction zone. The synthesis reaction is effected at a temperature of about 600° F. using a finely divided iron catalyst present in the reaction zone in a fluidized condition. A portion of the catalytic material of the synthesis reaction zone is removed therefrom and passed to the catalyst oxidation zone from where it passes through the system, previously described, and back to the synthesis reaction zone.

Several distinct advantages of the present combination process for the oxidation of methane and the subsequent hydrogenation of the carbon monoxide produced thereby should be emphasized. These advantages comprise the use of the same catalytic material throughout the system for use both as a heat transfer medium and as a catalytic agent for the oxidation of methane and the hydrogenation of carbon monoxide. Another advantage constitutes the use of the catalyst oxidation zone for oxidation of the catalyst for subsequent use in the methane oxidation step and for the regeneration of the used or spent catalyst from the synthesis reaction zone by the removal of carbonaceous deposits therefrom. Still another advantage is found in the accumulation of the heat of oxidation of the catalytic material for supplying at least a portion of the heat necessary to oxidize the methane to a suitable synthesis feed. Such advantages render the present process a highly economical one and makes it adaptable to the use of low grade catalytic materials which otherwise could not be used to advantage in the synthesis of organic compounds.

Certain valves, coolers, heat exchangers, heaters, pumps, etc., have been omitted as a matter of convenience and their use and location in the arrangement of apparatus will become obvious to those skilled in the art without departing from the scope of this invention. The size and length of certain conduits of Figures 1, 2, and 3 of the drawings are not proportional to the amount of fluid passing therethrough, nor the distance travelled, but are merely diagrammatical. It is not intended to limit any particular location as shown in the drawing, but various minor modifications and alterations, as well as omissions of certain pieces of equipment, will become obvious to those skilled in the art; consequently, the drawings should not be construed to be unnecessarily limiting to the present invention.

Having described my invention, I claim:

1. A process for the synthesis of organic compounds which comprises passing a methane-containing gas stream upward through a first reaction zone in the presence of a finely divided solid material comprising a reducible metal oxide which in its reduced form is active as a catalyst for the hydrogenation of carbon monoxide suspended in said gas stream under conditions such that methane is oxidized to carbon monoxide and hydrogen, maintaining a temperature of reaction in said first reaction zone between about 1100° F. and about 1700° F., withdrawing finely divided solid material comprising reduced metallic material from said first reaction zone and passing same to a second reaction zone, suspending said finely divided solid material in an upward flowing oxygen-containing gas under conditions such that the reduced metallic material is oxidized, maintaining a temperature of reaction in said second reaction zone between about 1200° F. and about 2000° F. and above the temperature of reaction in said first reaction zone, removing finely divided solid material comprising oxidized metallic material from said second reaction zone and returning same to said first reaction zone to supply oxygen for the oxidation of the methane therein, the weight of said finely divided solid material circulated between said first and said second reaction zone being at least five times the weight theoretically required for supplying oxygen for the oxidation of methane such that a major proportion of the heat required in said first reaction zone is supplied from the sensible heat of the solid material circulated from said second reaction zone, withdrawing from said first reaction zone a gaseous effluent containing carbon monoxide, hydrogen, and between about 0.001 and about 0.01 pound per cubic foot of gas of finely divided solid material comprising reduced metallic material, introducing said gaseous effluent containing said finely divided solid material from said first reaction zone into a third reaction zone, in said third reaction zone reacting hydrogen and carbon monoxide to produce organic compounds, maintaining the temperature of reaction in said third reaction zone between about 350° F. and about 750° F., removing finely divided solid material comprising metallic material from said third reaction zone and recycling same to said second reaction zone, removing from said third reaction zone a gaseous effluent comprising organic products of the process and separating same from said effluent, maintaining an upward linear velocity of the gaseous streams in the aforesaid reaction zones between about 0.5 and about 6 feet per second under conditions such that the finely divided solid material is suspended in the upward flowing gaseous stream in a pseudo-liquid fluidized condition whereby the finely divided solids achieve a highly turbulent condition in a pseudo-liquid dense phase, and maintaining the aforesaid reaction zones at substantially the same pressure between about atmospheric and about 500 pounds per square inch gage.

2. The process of claim 1 in which additional finely divided solid material is passed directly from the pseudo-liquid dense phase of said first reaction zone to said third reaction zone.

3. The process of claim 1 in which said finely divided solid material comprising a reducible metal oxide which in its reduced form is active as a catalyst for the hydrogenation of carbon monoxide is a montmorillonite type clay containing iron in an amount effective to promote the reaction of hydrogen and carbon monoxide to produce organic compounds.

4. The process of claim 1 in which said finely divided solid material comprises in addition to said reducible metal oxide a finely divided inert material.

5. A process for the synthesis of organic compounds which comprises passing a methane-containing gas stream upward through a first reaction zone in the presence of a finely divided solid material comprising a reducible metal oxide which in its reduced form is active as a catalyst for the hydrogenation of an oxide of carbon suspended in said gas stream under conditions such that methane is oxidized to produce hydrogen and an oxide of carbon, maintaining a temperature of reaction in said first reaction zone between about 500° F. and about 1700° F., withdrawing finely divided solid material comprising reduced metallic material from said first reaction zone and passing same to a second reaction zone, suspending said finely divided solid material in an upward flowing oxygen-containing gas under conditions such that the reduced metallic material is oxidized, maintaining a temperature of reaction in said second reaction zone at least 200° F. above the temperature of reaction in said first reaction zone, removing finely divided solid material comprising oxidized metallic material from said second reaction zone and returning same to said first reaction zone to supply oxygen for the oxidation of the methane therein, withdrawing from said first reaction zone a gaseous effluent containing hydrogen and an oxide of carbon and between about 0.001 and about 0.01 pound per cubic foot of gas of finely divided solid material comprising reduced metallic material, introducing said gaseous effluent containing said finely-divided solid material from said first reaction zone into a third reaction zone, maintaining the temperature of reaction in said third reaction zone between about 350° F. and about 750° F., removing finely divided solid material comprising metallic material from said third reaction zone and recycling same to said second reaction zone, removing from said third reaction zone a gaseous effluent comprising organic products of the process and separating same from said effluent, maintaining an upward linear velocity of the gaseous streams in the aforesaid reaction zones between about 0.5 and about 6 feet per second under conditions such that the finely divided solid material is suspended in the upward flowing gaseous stream in a pseudo-liquid fluidized condition whereby the finely divided solids achieve a highly turbulent condition in a pseudo-liquid dense phase, and maintaining the aforesaid reaction zones at substantially the same pressure between about atmospheric and about 500 pounds per square inch gage.

6. A process for the synthesis of organic compounds which comprises passing a methane-containing gas stream upward through a first reaction zone in the presence of a finely divided solid material comprising a reducible metal oxide which in its reduced form is active as a catalyst for the hydrogenation of carbon monoxide suspended in said gaseous mixture under conditions such that methane is oxidized to carbon monoxide and hydrogen, maintaining a temperature of reaction in said first reaction zone between about 1100° F. and about 1700° F., withdrawing finely divided solid material comprising reduced metallic material from said first reaction zone and passing same to a second reaction zone, suspending said finely divided solid material in an upward flowing oxygen-containing gas under conditions such that the reduced metallic material is oxidized, maintaining a temperature of reaction in said second reaction zone at least 200° F. above the temperature of reaction in said first reaction zone, removing finely divided solid material comprising oxidized metallic material from said second reaction zone and returning same to said first reaction zone to supply oxygen for the oxidation of the methane therein, the weight of said finely divided solid material circulated between said first and said second reaction zone being at least five times the weight theoretically required for supplying oxygen for the oxidation of methane such that a major proportion of the heat required in said first reaction zone is supplied from the sensible heat of the solid material circulated from said second reaction zone, withdrawing from said first reaction zone a gaseous effluent containing carbon monoxide, hydrogen, and finely divided solid material comprising reduced metallic material, introducing said gaseous effluent containing said finely-divided solid material from said first reaction zone into a third reaction zone in which hydrogen and carbon monoxide react to produce organic compounds, suspending finely divided solid material in said third reaction zone, maintaining the temperature of reaction in said third reaction zone between about 350° F. and about 750° F., removing finely divided solid material comprising metallic material from said third reaction zone and recycling same to said second reaction zone, removing from said third reaction zone a gaseous effluent comprising organic products of the process and separating same from said effluent, and maintaining a pressure within the aforesaid reaction zones between about atmospheric and about 500 pounds per square inch gage.

7. A process for the synthesis of organic compounds which comprises passing a methane-containing gas stream upward through a first reaction zone in the presence of finely divided solid material comprising a reducible metal oxide which in its reduced form is active as a catalyst for the hydrogenation of an oxide of carbon suspended in said gaseous mixture under conditions such that methane is oxidized to an oxide of carbon and hydrogen, maintaining a temperature of reaction in said first reaction zone between about 500° F. and about 1700° F., withdrawing finely divided solid material comprising reduced metallic material from said first reaction zone and passing same to a second reaction zone, suspending said finely divided solid material in an upward flowing oxygen-containing gas under conditions such that the reduced metallic material is oxidized, removing finely divided solid material comprising oxidized metallic material from said second reaction zone and returning same to said first reaction zone to supply oxygen for the oxidation of the methane therein, withdrawing from said first reaction zone a gaseous effluent containing an oxide of carbon, hydrogen, and entrained finely divided solid material comprising reduced metallic material, passing said gaseous effluent and said entrained solid material from said first reaction zone to a third reaction zone in which the hydrogen and oxide of carbon products of said methane oxidation are reacted with each other, said gaseous effluent withdrawn from said first reaction zone and passed to said third reaction zone being substantially the sole source of the principal reactants to said third reaction zone, suspending finely divided solid material in a gas stream in said third reaction zone, removing finely divided solid material comprising metallic material from said third reaction zone and recycling same to said second reaction zone, removing from said third reaction zone a gaseous effluent comprising organic products of the process, and maintaining a pressure within the aforesaid reaction zones between about atmospheric and about 500 pounds per square inch gage.

8. A process for the synthesis of organic compounds which comprises passing a methane-containing gas stream at a linear velocity between about 0.5 and about 6 feet per second upward through a first reaction zone in the presence of a finely divided reducible metal oxide which in its reduced form is active as a catalyst for the hydrogenation of an oxide of carbon suspended in a pseudo-liquid fluidized condition in said gaseous mixture under conditions such that methane is oxidized to produce hydrogen and an oxide of carbon, maintaining a temperature of reaction in said first reaction zone between about 1100° F. and about 1700° F., withdrawing finely divided reduced metallic material from a pseudo-liquid phase of said first reaction zone and passing same to a second reaction zone, entraining said metallic material in an upward flowing oxygen-containing gas under conditions such that the reduced metallic material is oxidized, the linear velocity of said gas in said second reaction zone being about 6 feet per second and sufficient to carry the entrained metallic material with the gas, maintaining a temperature of reaction in said second reaction zone between about 1600° F. and about 2000° F. and at least 200° F. above the temperature of reaction in said first reaction zone, withdrawing from said second reaction zone a gaseous effluent containing entrained oxidized metallic material, removing finely divided oxidized metallic material from said gaseous effluent from said second reaction zone and returning same to said first reaction zone to supply oxygen for the oxidation of the methane therein, withdrawing from said first reaction zone a gaseous effluent containing hydrogen and an oxide of carbon and finely divided reduced metallic material, introducing said gaseous effluent containing reduced metallic material from said first reaction zone into a third reaction zone in which the products of the oxidation of methane are converted to hydrocarbons and oxygenated organic compounds, maintaining in said third reaction zone a temperature between about 350° F. and about 750° F., suspending finely divided metallic material in a fluidized condition in said third reaction zone, removing finely divided metallic material from said third reaction zone and recycling same to said second reaction zone, removing from said third reaction zone a gaseous effluent comprising organic products of the process, and maintaining a pressure within the aforesaid reaction zones between about atmospheric and about 500 pounds per square inch gage.

9. A process for the synthesis of organic compounds which comprises passing methane upward through a first reaction zone in the presence of a finely divided solid material comprising a reducible metal oxide which in its reduced form is active as a catalyst for the hydrogenation of an oxide of carbon suspended in said gaseous mixture under conditions such that methane is oxidized to produce hydrogen and an oxide of carbon, withdrawing finely divided solid material comprising reduced metallic material from said first reaction zone and passing same to a second reaction zone, in said second reaction zone suspending said finely divided solid material in an upward flowing gas comprising oxygen under conditions such that the reduced metallic material is oxidized, maintaining a temperature of reaction in said second reaction zone at least 200° F. above the temperature of reaction in said first reaction zone, removing finely divided solid material comprising oxidized metallic material from said second reaction zone and returning same to said first reaction zone to supply oxygen for the oxidation of the methane therein, withdrawing from said first reaction zone a gaseous effluent containing hydrogen, an oxide of carbon and entrained finely divided solid material comprising reduced metallic material, passing said gaseous effluent and said entrained finely divided solid material from said first reaction zone to a third reaction zone, in said third reaction zone reacting the hydrogen and oxide of carbon products of said methane oxidation with each other, suspending finely divided solid material in a gas in said third reaction zone, removing finely divided solid material from said third reaction zone and recycling same to said second reaction zone, removing from said third reaction zone a gaseous effluent comprising organic products of the process, and maintaining the pressure of said third reaction zone not higher than the pressure prevailing in the other reaction zones.

10. A process for the synthesis of organic compounds which comprises passing methane through a first reaction zone in the presence of a finely divided reducible metal oxide which in its reduced form is active as a catalyst for the hydrogenation of an oxide of carbon suspended in said gaseous mixture under conditions such that methane is oxidized to produce hydrogen and an oxide of carbon, withdrawing finely divided reduced metallic material from said first reaction zone and passing same to a second reaction zone, suspending said finely divided material in flowing oxygen under conditions such that the reduced metallic material is oxidized, removing finely divided oxidized metallic material from said second reaction zone and returning same to said first reaction zone to supply oxygen for the oxidation of the methane therein, withdrawing from said first reaction zone a gaseous effluent containing hydrogen, an oxide of carbon and entrained finely divided reduced metallic material, passing said gaseous effluent and said entrained finely divided material from said first reaction zone to a third reaction zone in which the hydrogen and oxide of carbon products of the methane oxidation are reacted with each other, suspending finely divided reduced metallic material in said third reaction zone, removing finely divided metallic material from said third reaction zone and recycling same to said second reaction zone, and removing from said third reaction zone a gaseous effluent comprising organic products of the process and separating same from said effluent.

11. A process for the synthesis of organic compounds which comprises passing methane upward through a first reaction zone in the presence of finely divided solid material comprising a reducible metal oxide which in its reduced form is active as a catalyst for the hydrogenation of carbon monoxide suspended in said gas stream under conditions such that methane is converted to hydrogen and carbon monoxide, removing finely divided solid material comprising reduced metallic material from said first reaction zone, suspending said finely divided solid material comprising reduced metallic material in a second reaction zone with an upward flowing oxygen-containing stream under conditions such that the reduced metallic material is oxidized to an oxide, removing finely divided solid material comprising a metal oxide from said second reaction zone, introducing said finely divided solid material from said second reaction zone into said first reaction zone to supply oxygen to the methane reaction therein, removing a gaseous effluent containing carbon monoxide, hydrogen, and entrained finely divided solid material comprising reduced metallic material from said first reaction zone, rapidly cooling said reaction effluent from said first reaction zone to a temperature below about 700° F., introducing the cooled reaction effluent into a scrubbing zone, scrubbing the reaction effluent with an organic liquid fraction comprising hydrocarbons under conditions such that substantially all of the entrained solid material is removed from the effluent, compressing the scrubbed effluent which is substantially free from finely divided solid material and passing same to a third reaction zone, in said third reaction zone converting hydrogen and carbon monoxide to hydrocarbons, oxygenated organic compounds, and water, removing from said scrubbing zone a liquid organic scrubbing medium containing suspended solid material comprising reduced metallic material removed from said effluent, passing said scrubbing medium containing suspended solid material to said third reaction zone, maintaining intimate contact between organic liquid containing suspended metallic material and hydrogen and carbon monoxide in said third reaction zone, removing a vaporous effluent comprising hydrocarbons, water and oxygenated organic compounds from said third reaction zone, cooling and condensing said vaporous effluent to form a hydrocarbon-rich liquid phase and an aqueous-rich liquid phase containing oxygenated organic compounds, recovering oxygenated organic compounds from said aqueous-rich phase as products of the process, recycling substantially all of said hydrocarbon-rich liquid phase to the upper portion of said third reaction zone, removing an organic liquid phase from the lower portion of said third reaction zone, cooling a portion of said organic liquid phase withdrawn from said third reaction zone and recycling same to the upper portion of said third reaction zone, removing finely divided solid material from another portion of said organic liquid phase from said third reaction zone, returning the recovered solid material to said second reaction zone, recovering organic liquid substantially free from solid material as a product of the process, maintaining a pressure in said first and second reaction zone below about 100 pounds per square inch gage, and maintaining a pressure in said third reaction zone between about 100 and about 500 pounds per square inch gage.

12. A process for the synthesis of organic compounds which comprises passing a methane-containing stream upward through a first reaction zone in the presence of finely divided solid material comprising a reducible metal oxide which in its reduced form is active as a catalyst for the hydrogenation of an oxide of carbon suspended in said gas stream under conditions such that methane is oxidized to hydrogen and an oxide of carbon, removing finely divided solid material comprising reduced metallic material from said first reaction zone, suspending said finely divided solid material comprising reduced metallic material in a second reaction zone with an upward flowing oxygen-containing stream under conditions such that the reduced metallic material is oxidized to an oxide, removing finely divided solid material comprising a metal oxide from said second reaction zone, passing said finely divided solid material comprising metal oxide from said second reaction zone to said first reaction zone to supply oxygen to the methane reaction therein, removing a gaseous effluent containing an oxide of carbon, hydrogen, and entrained finely divided solid material comprising reduced metallic material from said first reaction zone, introducing the reaction effluent into a scrubbing zone, scrubbing the reaction effluent with an organic liquid fraction comprising hydrocarbons under conditions such that substantially all of the entrained solid material is removed from the effluent, compressing the scrubbed effluent which is substantially free from finely divided solid material and passing same from said scrubbing zone to a third reaction zone, in said third reaction zone converting hydrogen and carbon monoxide to hydrocarbons and oxygenated organic compounds, removing from said scrubbing zone, a liquid organic scrubbing medium containing suspended solid material comprising reduced metallic material removed from said effluent, passing said scrubbing medium containing suspended solid material to said third reaction zone, maintaining intimate contact between organic liquid containing suspended metallic material and hydrogen and an oxide of carbon in said third reaction zone, removing a vaporous effluent comprising hydrocarbons, water, and oxygenated organic compounds, cooling and condensing said vaporous effluent to form a hydrocarbon-rich liquid phase and an aqueous-rich liquid phase containing oxygenated organic compounds, recoving said oxygenated organic compounds from said aqueous-rich phase as products of the process, removing an organic liquid phase from the lower portion of said third reaction zone, removing finely divided solid material comprising reduced metallic material from said organic liquid phase from said third reaction zone, and returning the recovered solid material to said second reaction zone, and recovering the liquid organic phase substantially free from solid material as a product of the process.

13. A process for the synthesis of organic compounds which comprises passing methane through a first reaction zone in the presence of finely divided reducible metal oxide which in its reduced form is active as a catalyst for the hydrogenation of an oxide of carbon suspended in said methane under conditions such that methane is oxidized to produce hydrogen and an oxide of carbon, removing finely divided reduced metallic material from said first reaction zone, suspending said reduced metallic material in a second reaction zone in an upward flowing stream comprising oxygen under conditions such that the reduced metallic material is oxidized, removing finely divided oxidized metallic material from said second reaction zone, introducing said finely divided solid material from said second reaction zone into said first reaction zone to supply oxygen to the methane reaction therein, removing a gaseous effluent containing entrained finely divided reduced metallic material from said first reaction zone, passing said gaseous effluent and said entrained finely divided catalyst from said first reaction zone to a third reaction zone, in said third reaction zone converting the products of the methane oxidation to hydrocarbons and oxygenated organic compounds, maintaining intimate contact between an organic liquid containing metallic material and the products of the methane oxidation in said third reaction zone, removing a vaporous effluent comprising hydrocarbons, water, and oxygenated organic compounds from said third reaction zone, cooling and condensing said vaporous effluent to form a hydrocarbon-rich liquid phase and an aqueous-rich liquid phase containing oxygenated organic compounds, recovering oxygenated organic compounds from said aqueous-rich phase as products of the process, removing a liquid organic phase from the lower portion of said third reaction zone, removing finely divided solid material comprising reduced metallic material from said liquid organic phase from said third reaction zone, and returning the recovered solid material to said second reaction zone, and recovering the liquid organic phase substantially free from solid material as a product of the process.

14. The process of claim 7 in which said metal oxide comprises an oxide of copper.

15. A process for the synthesis of organic compounds which comprises passing a methane-containing gas stream upward through a first reaction zone in the presence of a finely-divided solid material comprising an iron oxide suspended in said gas stream under conditions such that methane is oxidized to carbon monoxide and hydrogen, maintaining a temperature of reaction in said first reaction zone between about 1100° F. and about 1700° F., withdrawing finely-divided solid material comprising reduced metallic material from said first reaction zone and passing same to a second reaction zone, suspending said finely-divided solid material in an upward flowing oxygen-containing gas under conditions such that the reduced metallic material is oxidized, maintaining a temperature of reaction in said second reaction zone at least 200° F. above the temperature of reaction in said first reaction zone and not higher than about 2000° F., removing finely-divided solid material comprising oxidized metallic material from said second reaction zone and returning same to said first reaction zone to supply oxygen for the oxidation of the methane therein, the weight of said finely-divided solid material circulated between said first and said second reaction zones being at least five times the weight theoretically required for supplying oxygen for the oxidation of methane such that a major proportion of the heat required in said first reaction zone is supplied from the sensible heat of the solid material circulated from said second reaction zone, withdrawing from said first reaction zone a gaseous effluent containing carbon monoxide, hydrogen, and between about 0.001 and about 0.01 pound per cubic foot of gas of finely-divided solid material comprising reduced metallic material, introducing said gaseous effluent containing said finely-divided solid material from said first reaction zone into a third reaction zone, in said third reaction zone reacting hydrogen and carbon monoxide to produce organic compounds, maintaining the temperature of reaction in said third reaction zone between about 350° F. and about 750° F., removing finely-divided solid material comprising metallic material from said third reaction zone and recycling same to said second reaction zone, removing from said third reaction zone a gaseous effluent comprising organic products of the process and separating same from said effluent, maintaining an upward linear velocity of the gaseous streams in the aforesaid reaction zones between about 0.5 and about 6 feet per second under conditions such that the finely-divided solid material is suspended in the upward flowing gaseous stream in a pseudo-liquid fluidized condition whereby the finely-divided solids achieve a highly turbulent condition in a pseudo-liquid dense phase, and maintaining the aforesaid reaction zones at substantially the same pressure between about atmospheric and about 500 pounds per square inch gage.

16. A process for the synthesis of organic compounds which comprises passing a methane-containing gas stream upward through a first reaction zone in the presence of a finely-divided solid material comprising an iron oxide suspended in said gas stream under conditions such that methane is oxidized to carbon monoxide and hydrogen, maintaining a temperature of reaction in said first reaction zone between about 1100° F. and about 1700° F., withdrawing finely-divided solid material comprising reduced metallic material from said first reaction zone and passing same to a second reaction zone, suspending said finely-divided solid material in an upward flowing oxygen-containing gas under conditions such that the reduced metallic material is oxidized, maintaining a temperature of reaction in said second reaction zone between about 1200° F. and about 2000° F. and above the temperature of reaction in said first reaction zone, removing finely-divided solid material comprising oxidized metallic material from said second reaction zone and returning same to said first reaction zone to supply oxygen for the oxidation of the methane therein, withdrawing from said first reaction zone a gaseous effluent containing carbon monoxide, hydrogen, and between about 0.001 and about 0.01 pound per cubic foot of gas of finely-divided solid material comprising reduced metallic material, introducing said gaseous effluent containing said finely-divided solid material from said first reaction zone into a third reaction zone, in said third reaction zone reacting hydrogen and carbon monoxide to produce organic compounds, maintaining the temperature of reaction in said third reaction zone between about 350° F. and about 750° F., removing finely-divided solid material comprising metallic material from said third reaction zone and recycling same to said second reaction zone, removing from said third reaction zone a gaseous effluent comprising organic products of the process and separating same from said effluent, maintaining an upward linear velocity of the gaseous streams in the aforesaid reaction zones between about 0.5 and about 6 feet per second under conditions such that the finely-divided solid material is suspended in the upward flowing gaseous stream in a pseudo-liquid fluidized condition whereby the finely-divided solids achieve a highly turbulent condition in a pseudo-liquid dense phase, and maintaining the aforesaid reaction zones at a pressure between about atmospheric and about 500 pounds per square inch gage.

17. A process for the synthesis of organic compounds which comprises passing a methane-containing gas stream upward through a first reaction zone in the presence of a finely-divided solid material comprising an iron oxide suspended in said gas stream under conditions such that methane is oxidized to carbon monoxide and hydrogen and iron oxide is reduced, maintaining a temperature of reaction in said first reaction zone between about 1100° F. and about 1700° F., withdrawing finely-divided solid material comprising reduced metallic material from said first reaction zone and passing same to a second reaction zone, suspending said finely-divided solid material in an upward flowing oxygen-containing gas under conditions such that the reduced metallic material is oxidized, maintaining a temperature of reaction in said second reaction zone between about 1200° F. and about 2000° F. and above the temperature of reaction in said first reaction zone, removing finely-divided solid material comprising oxidized metallic material from said second reaction zone and returning same to said first reaction zone to supply oxygen for the oxidation of the methane therein, the weight of said finely-divided solid material circulated between said first and said second reaction zones being at least about five times the weight theoretically required for supplying oxygen for the oxidation of methane such that a major proportion of the heat required in said first reaction zone is supplied from the sensible heat of the solid material circulated from said second reaction zone, withdrawing from said first reaction zone a gaseous effluent containing carbon monoxide, hydrogen, and finely-divided solid material comprising reduced metallic material, introducing said gaseous effluent containing said finely-divided solid material from said first reaction zone into a third reaction zone, in said third reaction zone reacting hydrogen and carbon monoxide to produce organic compounds, maintaining the temperature of reaction in said third reaction zone between about 350° F. and about 750° F., removing finely-divided solid material comprising metallic material from said third reaction zone and recycling same to said second reaction zone, removing from said third reaction zone a gaseous effluent comprising organic products of the process and separating same from said effluent as products of the process, and maintaining the aforesaid reaction zones at a pressure between about atmospheric and about 500 pounds per square inch gage.

18. A process for the synthesis of organic compounds which comprises passing a methane-containing gas stream through a first reaction zone in the presence of a finely-divided reducible metal oxide which in its reduced form is active as a catalyst for the hydrogenation of carbon monoxide suspended in a gaseous stream under conditions such that methane is oxidized to produce hydrogen and carbon monoxide and said metal oxide is reduced, maintaining a temperature of reaction in said first reaction zone between about 500 and about 1700° F., withdrawing finely-divided solid material comprising said metal oxide in a reduced form and passing same to a second reaction zone, passing an oxygen-containing gas through said second reaction zone at a velocity effective to suspend said finely-divided material under conditions such that reduced material is oxidized, maintaining a temperature of reaction in said second reaction zone substantially above the temperature of reaction in said first reaction zone, removing finely-divided metal oxide from said second reaction zone and returning same to said first reaction zone to supply oxygen for the oxidation of methane therein, withdrawing from said first reaction zone a gaseous effluent containing carbon monoxide, hydrogen and a substantial amount of said finely-divided material in reduced form, passing said gaseous effluent and said finely-divided material withdrawn with said gaseous effluent from said first reaction zone to a third reaction zone, the gaseous effluent from said first reaction zone passed to said third reaction zone being substantially the sole source of the principal reactants in said third reaction zone, in said third reaction zone reacting hydrogen and carbon monoxide to produce normally liquid organic compounds as products of the process, suspending said finely-divided contact material in said third reaction zone in a stream of gases passing therethrough, maintaining the temperature of reaction in said third reaction zone between about 350 and about 750° F., removing finely-divided material from said third reaction zone and recycling same to said second reaction zone, and removing from said third reaction zone a gaseous effluent comprising normally liquid organic compounds as products of the process.

19. A process for the synthesis of organic compounds which comprises passing a methane-containing gas stream upward through a first reaction zone in the presence of a finely-divided solid material comprising an iron oxide suspended in said gas stream under conditions such that methane is oxidized to carbon monoxide and hydrogen and iron oxide is reduced, maintaining a temperature of reaction in said first reaction zone between about 1100 and about 1700° F., withdrawing finely-divided solid material comprising reduced metallic material from said first reaction zone and passing same to a second reaction zone, passing air upward through said second reaction zone at a velocity effective to suspend said finely-divided solid material therein under conditions such that reduced metallic material is oxidized, maintaining a temperature of reaction in said second reaction zone substantially above the temperature of reaction in said first reaction zone, withdrawing finely-divided solid material comprising oxidized metallic material from said second reaction zone through a confined passageway and returning the thus withdrawn finely-divided solid material to said first reaction zone to supply oxygen for the oxidation of methane therein, withdrawing from said first reaction zone a gaseous effluent containing carbon monoxide, hydrogen and a substantial amount of said finely-divided solid material, quenching said effluent to a temperature below about 1000° F., passing the quenched effluent containing finely-divided solid material through a confined passageway to a third reaction zone, passing gases upward through said third reaction zone at a velocity effective to suspend finely-divided solid material in the gases in said third reaction zone under conditions such that hydrogen and carbon monoxide introduced therein are converted to normally liquid organic compounds, maintaining the temperature of reaction in said third reaction zone between about 350 and about 750° F., removing finely-divided solid material from said third reaction zone and recycling same to said second reaction zone, and removing from said third reaction zone a gaseous effluent comprising normally liquid organic compounds as products of the process.

20. The process of claim 19 in which a stripping gas is introduced into the confined passageway used for withdrawing finely-divided oxidized material from said second reaction zone in an amount to strip nitrogen from the withdrawn finely-divided solid material.

21. The process of claim 19 in which additional finely-divided solid material is introduced directly from said first reaction zone into the confined passageway containing the quenched effluent from said first reaction zone and in which a vaporizable liquid is introduced into the effluent from said first reaction zone in an amount sufficient to cool the effluent and to aid in the passage of finely-divided solid material through the confined passageway to said third reaction zone.

ARNOLD BELCHETZ.

REFERENCES CITED

The following references are of record in the file of this patent:

UNITED STATES PATENTS

| Number | Name | Date |
|---|---|---|
| 1,899,184 | DeSimo | Feb. 28, 1933 |
| 2,159,077 | Duftschmid et al. | May 23, 1939 |
| 2,161,974 | Peck | June 13, 1939 |
| 2,183,145 | Michael et al. | Dec. 12, 1939 |
| 2,253,607 | Boyd et al. | Aug. 26, 1941 |
| 2,347,682 | Gunness | May 2, 1944 |
| 2,348,418 | Roesch et al. | May 9, 1944 |
| 2,393,909 | Johnson | Jan. 29, 1946 |
| 2,409,235 | Atwell | Oct. 15, 1946 |
| 2,414,276 | Sensel et al. | Jan. 14, 1947 |
| 2,417,164 | Huber | Mar. 11, 1947 |
| 2,425,754 | Murphree et al. | Aug. 19, 1947 |
| 2,455,419 | Johnson | Dec. 17, 1948 |
| 2,490,986 | Symonds | Dec. 13, 1949 |